(12) United States Patent
Jovine

(10) Patent No.: US 8,440,439 B2
(45) Date of Patent: *May 14, 2013

(54) METHOD OF CARBON SEQUESTRATION

(76) Inventor: Raffael Jovine, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,425

(22) Filed: Aug. 31, 2012

(65) Prior Publication Data

US 2013/0005015 A1 Jan. 3, 2013

Related U.S. Application Data

(63) Continuation of application No. 12/998,764, filed as application No. PCT/GB2009/002568 on Oct. 28, 2009, now Pat. No. 8,278,082.

(30) Foreign Application Priority Data

Oct. 29, 2008 (GB) .................................. 0819865.7

(51) Int. Cl.
C12P 3/00 (2006.01)
C12M 1/00 (2006.01)
C12N 1/12 (2006.01)

(52) U.S. Cl.
USPC ....................... 435/168; 435/292.1; 435/257.1

(58) Field of Classification Search ................... 435/168, 435/292.1, 257.1
See application file for complete search history.

(56) References Cited

U.S. PATENT DOCUMENTS

| | | |
|---|---|---|
| 1,952,520 A | 3/1934 | Urquhart |
| 3,928,145 A | 12/1975 | Othmer |
| 4,055,145 A | 10/1977 | Mager et al. |
| 4,286,434 A | 9/1981 | Moisdon |
| 4,346,561 A | 8/1982 | Kalina |
| 4,726,191 A | 2/1988 | Kawamura |
| 5,967,085 A | 10/1999 | Kawamura |
| 5,992,089 A | 11/1999 | Jones et al. |
| 2002/0131823 A1 | 9/2002 | Sherman |
| 2004/0161364 A1 | 8/2004 | Carlson |

FOREIGN PATENT DOCUMENTS

| | | |
|---|---|---|
| GB | 2383978 | 7/2003 |
| GB | 2464763 B1 | 10/2010 |
| JP | 2002-262858 | 9/2002 |
| WO | WO2007147028 | 12/2007 |
| WO | WO 2010-049687 A1 | 5/2010 |

OTHER PUBLICATIONS

PCT International Preliminary Report on Patentability, PCT/GB2009/002568, dated Feb. 3, 2011.
PCT International Search Report and the Written Opinion, PCT/GB2009/002568, dated Jan. 7, 2010.
Response to the Examination Report for GB 2464763 dated Oct. 9, 2009.
Search Report for GB 2464763 dated Apr. 29, 2009.
Examination Report for GB 2464763 dated Oct. 12, 2009.
Patents status information for GB 2464763 printed Jun. 6, 2011.
GCC Patent Office Examination Report for Application No. GCC/P/2009/14586 dated Jun. 21, 2011.
Takano et al., CO2 fixation by artificial weathering of waste concrete and coccolithophorid algae cultures, Energy Convers Mgmt 36(6-9):697-700, 1995.

*Primary Examiner* — Rosanne Kosson
(74) *Attorney, Agent, or Firm* — TraskBritt

(57) ABSTRACT

Described are methods, apparatus, and a system for robust and long-term sequestration of carbon. In particular, described is the sequestration of carbon as carbonates, using coccolithophorid algae grown using land-based aquaculture. Also described are methods of Ocean Thermal Energy Conversion (OTCE).

23 Claims, 1 Drawing Sheet

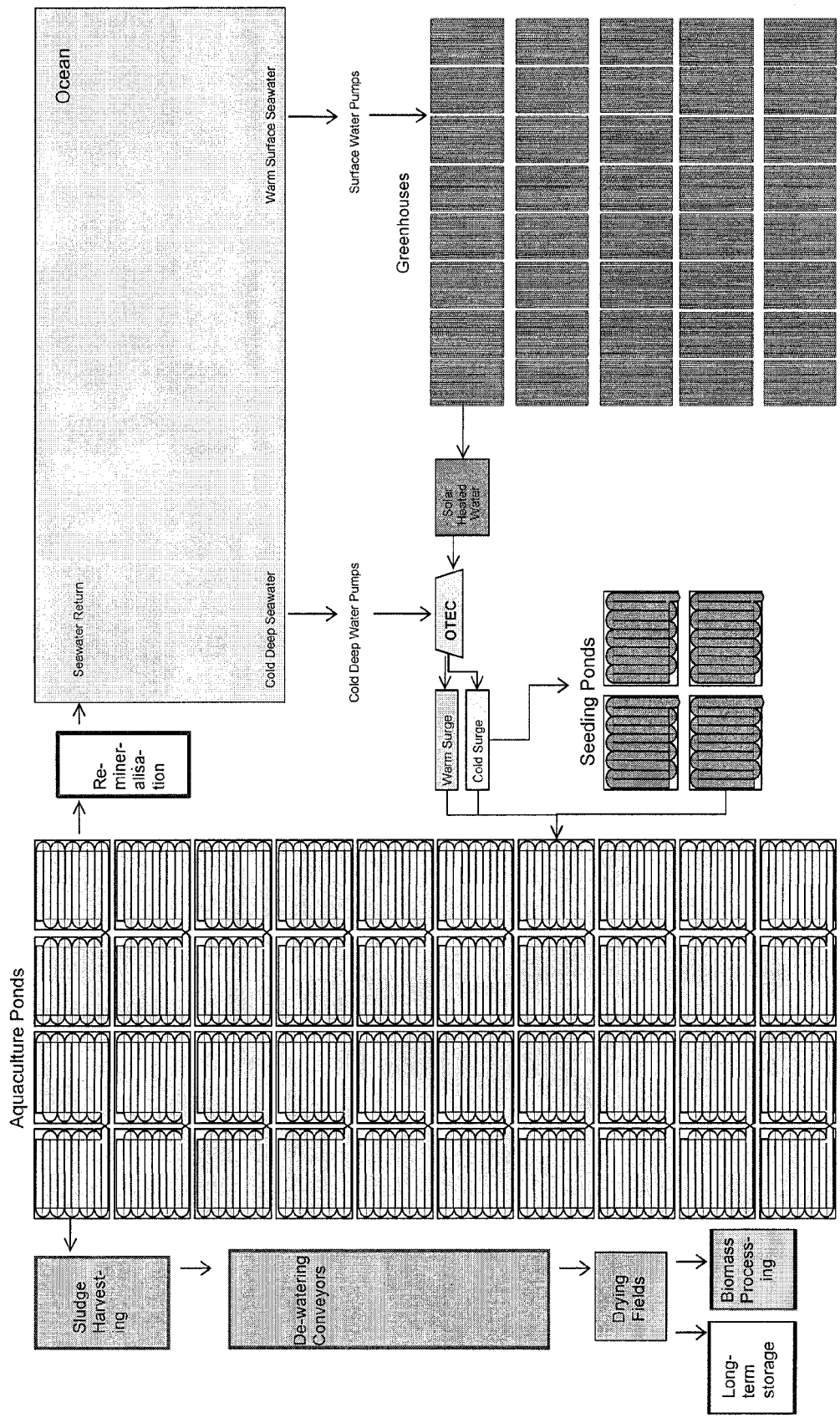

METHOD OF CARBON SEQUESTRATION

CROSS-REFERENCE TO RELATED APPLICATIONS

This application is a continuation of U.S. patent application Ser. No. 12/998,764, filed Sep. 13, 2011, now U.S. Pat. No. 8,278,082, which application is a national phase entry under 35 U.S.C. §371 of International Patent Application PCT/GB2009/002568, filed Oct. 28, 2009, designating the United States of America and published in English as International Patent Publication WO2010/049687 A1 on May 6, 2010, which claims the benefit under Article 8 of the Patent Cooperation Treaty to Great Britain Patent Application Serial No. 0819865.7, filed Oct. 29, 2008, the disclosure of the entirety of each of which is hereby incorporated herein by this reference.

TECHNICAL FIELD

The disclosure relates to methods and apparatus for robust and long-term sequestration of carbon using natural carbon fixation. In particular, the disclosure relates to sequestration of carbon as carbonates, using coccolithophorid algae.

BACKGROUND

Excess global warming that is currently taking place is thought to be largely caused by human activity increasing the "greenhouse effect." Since the industrial revolution, anthropogenic emissions have increased the amount of greenhouse gasses present in the atmosphere. In particular, combustion of fossil fuels has led to an increase in the atmospheric concentration of the greenhouse gas $CO_2$.

In order to mitigate the effects of global warming caused by atmospheric $CO_2$, attempts have been made to capture and sequester carbon. $CO_2$ can be captured at point sources, such as power or cement plants, to prevent it from being released into the atmosphere or it can be removed from the atmosphere at remote sites with technologies that remove $CO_2$ directly from the air.

Once captured, the $CO_2$ can be stored in a number of ways; for example, in deep geological formations, in deep ocean masses, in the form of mineral carbonates or in the form of bio-char. In the case of deep ocean storage, there is a risk of re-emission and of greatly increasing the problem of ocean acidification, a problem that also stems from the excess of carbon dioxide already in the atmosphere and oceans. Geological formations are currently considered the most promising sequestration sites.[1] However, the use of limited geological sites requires transport of the $CO_2$ in pipelines, either as a gas or as a supercritical liquid. $CO_2$ storage in geological formations is, therefore, associated with further energy consumption to transport the $CO_2$ and to inject it into underground geological formations. Leakage of the stored carbon is also a major concern with both ocean and geological carbon sequestration.

Mineral sequestration traps carbon in the form of solid carbonate metal salts. One way to sequester carbon as carbonates is to use algae, in particular, coccolithophorid algae, which are marine algae that form $CaCO_3$ coccoliths. These algae take up $CO_2$ from the atmosphere to form coccoliths, thus removing $CO_2$ from the atmosphere and storing it in mineral form. Natural ocean-based coccolithophorid algal blooms are a well-documented method of carbon fixation in coccoliths as is evidenced by many limestone deposits worldwide. However, ocean blooms of coccolithophorid algae are unpredictable, and the algae cannot be harvested to ensure that the sequestered carbon is stored long-term to prevent its re-release back into the environment via remineralization of the algae after they complete their periodic and unpredictable, growth cycle. Natural blooms do not suffice to compensate for the increased atmospheric $CO_2$[2] and cannot be controlled.

SUMMARY OF THE DISCLOSURE

The inventor hereof has concluded that many problems that are associated with the manipulation of ocean-based blooms of natural algae for carbon sequestration can be overcome by the use of land-based aquaculture of coccolithophorid and other algae. However, land-based aquaculture requires large amounts of nutrient-rich seawater, and also requires large amounts of space for the aquaculture preserve.

Provided is a method of sequestration of $CO_2$ from the atmosphere into solid form, the method comprising:
culturing coccolithophorid algae in seawater using land-based aquaculture under conditions wherein atmospheric $CO_2$ is converted by the algae into $CaCO_3$ and/or bio-char;
wherein the seawater in which the algae are cultured is the discharge of an ocean thermal energy conversion (OTEC) process; and
wherein the source water for the OTEC process is provided by i) cold seawater and ii) seawater that has been warmed in land-based greenhouses using solar energy.

The method makes use of an OTEC process that has been modified to make it suitable for use in combination with large-scale land-based aquaculture of coccolithophorid algae for carbon sequestration. OTEC is a method for generating electricity that utilizes the temperature difference that exists between deep and shallow waters. The use of OTEC is currently limited to particular geographical areas where the temperature difference between the warm surface water and the cold deep seawater is large, ideally at least 20° C. This temperature difference only really occurs in equatorial waters, defined as lying between 10° N and 10° S, which are adequate.[3] In these areas, coastal land use is intensive. In contrast, in areas where there is significant availability of coastal land that lies unused, the surface water is cool and, thus, there is an insufficient temperature differential for OTEC to function efficiently.

The inventor hereof has realized that by heating seawater using solar energy under controlled conditions, a sufficient temperature difference can be established between this heated water and cooler, nutrient-rich deep seawater to allow OTEC to be used in regions where land is unutilized and/or available. This modified OTEC system can thus be used in regions with vast areas of arid, desert or under-utilized or non-productive coastal land (such as in the Gulf States, the Californian Peninsula in Mexico, Australia, Western, Northern and Southern Africa and Chile), which are ideal for large-scale land-based aquaculture. Because this land is commonly not used for economic benefit, the economics of this modified system become practical for carbon sequestration.

This solves several problems from which land-based aquaculture of marine algae suffers, at least in the context of carbon sequestration. Of course, pumping nutrient-rich seawater onto land requires large amounts of energy. Given that the purpose of these aquaculture preserves is to provide a net carbon sink, any $CO_2$ produced in order to supply the water for the aquaculture must be more than offset within the $CO_2$ that is sequestered by the algae. Thus, only renewable, or carbon neutral, sources of energy are suitable in this context. Examples of renewable energy sources include solar energy, high altitude and ground level wind power, tidal, hydroelectric, and biomass fueled power generation. Other carbon neutral, although not renewable energy sources, such as nuclear or geothermal power may also be suitable to generate the power necessary to pump the large quantities of water for the aquaculture preserves. Both nuclear and geothermal power have the advantage of creating heated water that could be exploited by OTEC.

A much preferred source of energy for use in the method hereof is Ocean Thermal Energy Conversion (OTEC), for example, as described in references 3 and 4. One reason for this is that one of the by-products of OTEC is an abundant supply of nutrient-rich deep seawater, which is generally considered to be a by-product of OTEC, and is referred to herein as OTEC discharge. This makes OTEC a suitable source of energy to combine with aquaculture, as described in references 5 and 6 describing the combination of sea-water wells extending through rock and aquaculture with power generation. The sea-water well concept is limited to favorable geological conditions, for example, encountered in Hawaii. However, improvements in pipe-technology achieve the same benefits of seawater wells without being geographically confined.

OTEC has been used in combination with open-water aquaculture for food products, such as high-value farmable commercial species and algae for human consumption. However, these sites are limited in scale. Because the regions that are currently suited to the application of OTEC are also regions in which the land surrounding the OTEC sites is valuable land, for example, for agricultural, habitational or recreational purposes, such as narrow coastal bays in Hawaii, OTEC cannot be used on a very large scale in these environments. For example, a 100 MW OTEC power plant in combination with land-based coccolithophorid algal aquaculture to be suitable to sequester large amounts of atmospheric $CO_2$ requires an area of approximately 40 $km^2$ of aquaculture preserve or greater. For these reasons, it would hitherto not have been considered to combine OTEC with large-scale land-based aquaculture because the land available for the large aquaculture preserves has relevant alternative economic utility. Indeed, the OTEC systems that are presently known in the art are not suitable to be used as an energy source to supply seawater for land-based aquaculture of coccolithophorid algae for large-scale carbon sequestration.

As well as extending the geographical range of OTEC, heating seawater prior to use in OTEC is also advantageous because it increases the temperature difference between the hot and cold water, thus increasing the efficiency of the OTEC system.

A further advantage of the method of carbon sequestration described herein, in which the surface water is heated before use in OTEC, is that the water is heated to a temperature that inactivates substantially all micro-organisms, thus reducing bio-fouling of the OTEC system, the heat exchangers or the subsequent aquaculture preserves.

Carbon sequestration methods currently exist that are based on the stimulation of growth of algae in the ocean. However, the methods hereof are distinct from these in that they are carried out using land-based aquaculture. Per the disclosure, algal growth takes place in an aquaculture preserve, which has several advantages.

In one embodiment of the method hereof, discharge from OTEC may be combined with cold seawater to provide water at the optimum temperature for coccolithophorid algae aquaculture. In an alternative embodiment, discharge from OTEC may be cooled by running it through a shaded area before it is seeded with algae. In this manner, the culture conditions such as water temperature can be adjusted such that the algae grow at a much higher density than are commonly found in their natural environment.

Nutrient availability can also be tightly controlled, both by varying the amount of nutrient-rich and cold seawater from depths of up to 1,000 meters that enters the aquaculture preserve, or by adding exogenous nutrients to the aquaculture water. The step of adding exogenous nutrients to the aquaculture water forms a further aspect hereof.

A still further advantage is that algal growth is isolated from the ocean ecosystem. This mitigates most, if not all, of the environmental problems associated with ocean-based algal blooms. In ocean-based blooms, currents and atmospheric conditions can rapidly and unpredictably alter the growth environment. Predatory or competing organisms can adversely affect the growth of the desired algae. Nutrients may be depleted or where nutrients are available at depth, there is insufficient sunlight to sustain the bloom. Containing microalgae in ocean-based aquaculture is impractical since the containment structures would have to be impermeable to microscopic organisms on the outside of the aquaculture facility. Managing the algal bloom in situ also requires the effective harvesting of algae under dynamic open ocean conditions, which are not as stable and predictable as land-based aquaculture.

Furthermore, using land-based aquaculture, there can be no uncertainty or ambiguity as to the amount of carbon that is sequestered. The coccolithophorid algae can be harvested as one aspect of the process, thus allowing the amount of sequestered carbon to be tangibly measured and quantified. The step of harvesting the coccolithophorid algae thus forms a further aspect hereof.

Once the algae have been harvested, the culture water can be returned to the ocean. After having been used for aquaculture of coccolithophorid algae, the culture water generated in the method hereof will contain significantly less dissolved $CO_2$ than ambient seawater and can, therefore, contribute to the reduction of ocean acidification. If necessary, the culture water can be supplemented with dissolved calcium minerals to offset the effects of ocean acidification, which is itself associated with detrimental environmental effects. This is particularly relevant in the context of coastal coral that are particularly sensitive to ocean acidification. Therefore, provided is a method of carbon sequestration as described herein, further comprising returning the water to the sea after harvesting the coccolithophorid algae.

Also provided is a system for carbon sequestration, the system comprising:
a) means to heat seawater using solar power,
b) an OTEC system using heated surface seawater and cold deep seawater; and
c) a land-based coccolithophorid algae aquaculture preserve provided with water from the OTEC system of part b).

In one embodiment, the aquaculture preserve comprises "aquaculture ponds." As used herein, the term "aquaculture ponds" is intended to describe man-made ponds that are long and narrow in shape and that provide a flow-through system for the aquaculture water. It is preferred that the aquaculture ponds form a large surface area for growth of the algae. Indeed, provided is an economically viable method of carbon sequestration in part because of the large scale of the aquaculture preserve. In one embodiment, combining a 100 MW OTEC plant with greenhouses and the aquaculture preserve gives a total surface area of 30 $km^2$ to 100 $km^2$ or 50 $km^2$ to 100 $km^2$, depending on configuration and, in a particular embodiment, the surface area is about 65 $km^2$. Local geography permitting, this arrangement of an OTEC plant, a greenhouse and aquaculture preserve can be significantly smaller, for example, for a 500 KW OTEC plant, the surface area could be less than approximately 1.5 km². Similarly, larger OTEC power plants can be combined with aquaculture preserves that match their discharge. For example, a 500 MW OTEC plant, greenhouse, aquaculture assembly would require approximately 300 km².

In one embodiment, the OTEC plant with greenhouses and aquaculture preserve are a model system, and have a total surface area of 0.5 km² to 1 km² or less. For many locations, the surface area required for the greenhouses will be approximately half of the surface area required for the aquaculture ponds. In the preferred embodiment near a cold surface water ocean outside of the conventional OTEC tropical ocean sites, this means approximately 20 km² for the greenhouses and 40 km² for the aquaculture ponds.

In any of the methods and systems described herein, the means to heat seawater using solar power may be a greenhouse. In one embodiment, the greenhouse is made of a plastic material.

In any of the methods and systems described herein, the coccolithophorid algae may preferably be a strain of *Emiliana huxleyi*. Other examples include, but are not limited to, strains of *Gephyrocapsa oceanica, Calcidiscus leptoporus, Coccolithus braarudii, Braarudosphaera bigelowi*, and *Syracosphaera pulchra*.

BRIEF DESCRIPTION OF THE DRAWING

FIG. 1: Schematic diagram of the system for sequestering carbon.

DETAILED DESCRIPTION OF THE INVENTION

Methods of Carbon Sequestration

The method is based on growing large quantities of carbon sequestering coccolithophorid algae in nutrient-rich water, originating from deep coastal seawater, on land. First, seawater is pumped from depth to sea level. Deep seawater is more nutrient rich than surface water and has a higher concentration of supersaturated $Ca^{++}$ ions in solution and, thus, is better suited for use in aquaculture. A portion of the water is heated, preferably using solar energy, for example, by passing the water through large greenhouses for solar heating. If sufficiently nutrient rich, an alternative source of warm water can be surface seawater. This raises the temperature of the water to over 30° C., for example, to 35° C., 40° C., 45° C., 50° C., 55° C. or hotter. The remainder is not heated and, therefore, remains at a temperature of about 5° C. to 10° C., for example, 5° C., 6° C., 7° C., 8° C., 9° C., or 10° C. The heated and unheated water is then used to generate electricity using OTEC. The electricity generated by this process can be used to process algae that have been grown in the aquaculture preservers. The energy can also be used to pump the deep seawater to the surface, and/or to pump water through additional aquaculture preserve, thereby increasing the aquaculture yield while reducing the total OTEC-generated power available for resale.

The discharge water from the greenhouses and OTEC condensers can be combined in an aquaculture preserve to provide water at a temperature suitable for coccolithophorid algal growth. The water can be combined to provide an optimum growth temperature. The optimum growth temperature will depend on the particular coccolithophorid algae species and is typically between 15° C. and 25° C., for example, 15° C., 16° C., 17° C., 18° C., 19° C., 20° C., 21° C., 22° C., 23° C., 24° C. or 25° C. or warmer.

Coccolithophorid algae are cultured in the aquaculture preserve, generally for several days. In a preferred embodiment, the algae are cultured for four to seven days, but may be cultured for up to twenty days. In one embodiment, the algae are cultured for six days. During this time of exponential growth, the algae sequester $CO_2$ as $CaCO_3$ in the coccoliths or plates surrounding their cells. These calcite plates increase in number according to environmental conditions or until the cells reach a steady-state growth phase and at which point the coccoliths may increase further in number per cell.

After passing through the aquaculture preserve for several days, the algae may be removed from the seawater. The seawater may then be returned to the sea. The harvested algae can be dried, for example, sun-dried. The $CO_2$ taken up during the aquaculture process is stored in the dried algae as $CaCO_3$ and dried biomass.

Sun-drying the biomass for long-term stock-piling near the aquaculture preserve is the simplest option for carbon storage. It requires the least infrastructure and investment and takes advantage of the total carbon captured in the biomass, and not only that captured in the coccoliths. Sun-dried biomass can be readily quantified and the carbon content can be demonstrably verified. Thus, the methods hereof are, therefore, suitable for the highest grade carbon offset schemes, as the amount of carbon sequestration is physically available for analysis and quantification.

In a separate embodiment, the coccoliths and biomass are separated and processed independently of each other. The coccoliths are inert and can be readily stockpiled. The total volume of dried coccoliths to sequester 1 billion tons of $CO_2$ in the form of $CaCO_3$ coccoliths is estimated at 2,611 kg/m³ is 869,400 m³ sequestered per year or a volume of 20 meters high by 200 meters wide by 200 meters long. Given that this is distributed over many sites, for example, 1,000 aquaculture preserves in several countries, this does not represent a significant disposal or storage burden for any one site. In one embodiment, the space required for disposal is 10×10×1.75 meters of $CaCO_3$ per algal aquaculture pond per year.

In an alternative embodiment, the harvested algae can be fragmented into multiple components. Processing of the harvested algae at a basic pH enables the separation of the coccoliths from the remaining organic biomass. Once extracted, the organic biomass can be used for the production of biofuel, biological oils, fatty acids and other materials that can be used for the generation of, for example, animal feedstock. In a further embodiment, the remnants or bio-char from such further processing could be used to enrich the soil of, or to create fertilizer for, local agriculture.

The additional processing is optional and can be performed based on the desirability of creating additional products from the organic biomass, which would reduce the overall yield of the sequestered carbon although renewable resources created from the biomass would still qualify for carbon offset payments. Energy required for additional processing can be supplied from OTEC.

Coccolithophorid Algae

Coccolithophorid algae are single-celled algae belonging to the division haptophytes. A model coccolithophorid alga for use in the invention is *Emiliana huxleyi*, or a variant thereof. *E. huxleyi* naturally blooms in waters between 15° C. and 20° C. and higher. Unlike other algae, its growth does not become inhibited by high levels of sunlight. During exponential growth, each cell produces approximately twenty $CaCO_3$ plates or coccoliths. These coccoliths, therefore, sequester carbon in mineral form and, therefore, sequester carbon in a robust manner. Coccolithophorid blooms often occur in relatively calm water, so providing another advantage in the context hereof relative to other algae. Because coccolithophorid algae can grow in calm water, there is little or no need for agitation of the aquaculture water beyond that provided by the movement of the water through the aquaculture ponds.

A further advantage of $E.\ huxleyi$, in particular, is its rapid growth. $E.\ huxleyi$ grows rapidly and after four to seven days of land-based aquaculture, it will achieve as many as ten doublings or up to a thousand-fold increase in biomass. Under ideal culture conditions, $E.\ huxleyi$ is capable of up to two doubling per day.[7]

By comparison, in the open ocean, coccolithophorid algae growth is limited by sub-optimal temperatures, limited nutrient availability, aging of the bloom and other biological and environmental factors.

In the land-based aquaculture hereof and, in particular, in the aquaculture ponds that are a preferred feature of the described system, nutrients including phosphate, nitrate and calcium can be added in a controlled manner to ensure that the coccolithophorid algae grow at a higher density than that which can be achieved in ocean-based aquaculture. Furthermore, maximum exposure to light can be ensured, such that no biomass is lost due to sinking out of optimal light zones. In addition, biological contamination can be minimized by the pre-treatment of the seawater in the greenhouses before it is used for aquaculture.

Another advantage of $E.\ huxleyi$ is that as the algae mature, they begin releasing long extra-cellular organic molecules called Transparent Exopolymer Particles (TEPs).[8] Together with coagulants and flocculants, these large molecules dramatically increase aggregation of the algae.

Flocculants and coagulants used in wastewater treatment, such as alum and polymeric flocculants, can rapidly accelerate the formation or "marine snow" as mature algae aggregate. These aggregates rapidly settle and can be easily harvested, thus reducing the cost of harvesting the algae and extracting biomass from the seawater. In an alternative embodiment, the aggregates can be rapidly floated to the surface using fine bubble aeration. This can be accomplished by placing long rows of fine bubble aerators along the bottom of the final stretch of the aquaculture ponds to create rows of bubble curtains that carry the "marine snow" to the surface for harvesting by mechanical skimmers. As the aggregated algae accumulates, the aggregates can be removed using automated systems skimmers directly from the surface of the aquaculture water creating an algal slurry at approximately ten tenfold concentration of the algae.

An alternative harvesting technique is dissolved air floatation to concentrate the algae on the surface of the aquaculture water for simple skimming, as is commonly employed in wastewater treatment.[9] These well-established industrial and wastewater treatment techniques can purify very large volumes of water. In another alternative, the aquaculture water can be passed through circular centrally driven clarifiers (for example, suction clarifiers) to harvest the algae from the aquaculture water. The harvested aggregated algal sludge still retains a significant quantity of seawater. This sludge can be further thickened in deep cone thickeners or clarifiers. To significantly accelerate this thickening process, cationic flocculants can be used to clump the algae into clumps effecting another five to fifteen-fold concentration. This algal paste can then be transported on conveyor belts to drying fields that are also lined with geofabrics or geomembranes to dry in the ambient desert air where the aggregated algae are dried, as is common, for example, with commercial crops.

The system does not have to be populated with $E.\ huxleyi$. Other coccolithophorid algae can also be used. Aquaculture parameters can be changed to optimize growth of any chosen coccolithophorid or other desirable algae.

After the algae have been harvested, the water can be treated, for example, by being passed through the greenhouses again to heat inactivate any remaining cells. In this way, the potentially negative impact of the aquaculture water being discharged into local seawater can be eliminated. Alternatively, the used seawater can be pumped to a depth where it bypasses the local surface seawater entirely.

Carbon Fixation by Coccolithophorid Algae

As a result of the differences in molecular weight of $CO_2$ and $CaCO_3$ ($CO_2$ has a molecular weight of 44 MW; $CaCO_3$ has a molecular weight of 100 MW), to grow sufficient coccolithophorid calcite plates to sequester one billion tons of $CO_2$, 2.27 billion tons of coccoliths have to be grown. Since a single coccolith (one of about 20 to 30 plates during exponential growth) of an $Emiliana\ huxleyi$ cell[10] typically weighs 18 to 26 pg, each coccolithophorid cell can sequester approximately 230 pg of $CO_2$.

Under unmodified natural growth conditions in unmodified surface seawater, i.e., ocean-based, coccolithophorid blooms have a typical density of $3 \times 10^8$ cells/liter.[11] This equates to the creation of about 0.156 gr/calcite per liter in the form of coccoliths. This is well below the potentially maximum limit of available ~0.95 gr of $CaCO_3$ sequestered per liter of seawater as dictated by the availability of naturally available dissolved calcium while preserving the stoichiometry of dissolved calcium in seawater. By comparison, conditioned seawater enriched with nutrients can sustain much higher growth rates, reaching a much higher cell density of about $1 \times 10^{10}$ cells/liter[7] in K media[12] or in F/50 media.[13] At $1 \times 10^{10}$ cells/liter, this equates to 5.2 pg$\times 10^{12}$ calcite fixed per liter of growth medium. At these optimal high-growth densities in nutrient-enriched seawater, up to 5.2 gr of calcite can be fixed per liter. However, achieving this very high growth density and coccolith yield would require large-scale addition of nutrients and minerals.

Another method by which the coccolith yield could be increased would be through increased residence time of the algae in the ponds to support growth at high-cell densities in late-stage growth (not exponential growth). At this point in the cell cycle, a larger number of coccoliths are formed per cell. However, late stage, very high density culture of coccolithophorid algae would be much more difficult to control and the residence time of the algae would have to be significantly increased, thereby dramatically increasing the size of the algal ponds. For this reason, a preferred embodiment is planned that maximizes the yield of algae in exponential growth in the algal ponds and harvests these cells at the point when they have between 20 to 30 coccoliths per cell.

It is envisaged that the algae will be grown at approximately 3.0 to $3.5 \times 10^9$ cells/liter in the invention, reaching an average of 1.5 g calcite formed per liter of nutrient and mineral enriched seawater. At this density, much of the calcium and a significant proportion of the magnesium present in the seawater will also be sequestered in the algal biomass.

Aquaculture

The aquaculture takes place in an aquaculture preserve on land. In a preferred embodiment, the aquaculture takes place in continuously flowing aquaculture ponds or raceway ponds. Flowing aquaculture ponds are continuously agitated habitats for algae. They are preferably significant in size, and open-air. In these aquaculture ponds, the algae are exposed to sunlight, and the seawater is exposed to atmospheric $CO_2$ while providing a controlled growth environment for the algae.

One advantage of aquaculture ponds is that they provide favorable growth environment for coccolithophorid algae by ensuring constant turnover of the seawater, preventing settling or stratification of the algae and ensuring maximum air exchange. Air exchange is doubly significant, because the algal growth rate will rapidly deplete the inorganic carbonate ($HCO_3^-$) naturally occurring in the seawater. This will be replenished from atmospheric $CO_2$ to sustain algal growth. Because of the turnover of the seawater in aquaculture ponds and their preferably shallow cross section, all of the aquaculture seawater will be frequently exposed to the atmosphere to absorb $CO_2$.

In the preferred embodiment, the seawater in the aquaculture ponds is fed and completely replaced with fresh seawater from the greenhouses and OTEC condensers, and the entire volume of the aquaculture pond is replaced, preferably every four to seven days, given an aquaculture pond with a cross-section of approximately 100 meters and a depth of approximately 3 meters. The depth of the aquaculture ponds can be varied according to need to ensure that all the algae is optimally irradiated with sunlight. For example, aquaculture pond depth could be 0.02, 0.1, 0.2, 0.5, 1, 2, 3, 4, 5, 6, 7, 8, 9 or 10 or more meters. In the preferred embodiment, this results in a flow rate of approximately 2.4 meters per minute during daylight hours. At this flow rate and with the repeat turnover as the seawater flows around the bends of the aquaculture, ensuring frequent seawater turn-over, this preferred embodiment supports the exponential growth phase of the coccolithophorid algae. The flow rate through the aquaculture ponds can be varied from less than 0.5 meter per minute to greater than 10 meters per minute to adjust the residence time of the algae and maximize the capacity for their growth and carbon sequestration. For example, aquaculture pond flow rates could be 1, 2, 3, 4, 5, 6, 7, 8, 9 or 10 or more meters per minute.

The aquaculture ponds may be seeded with algae directly, or supplied with algae from seeding ponds. Seeding ponds are ponds that are positioned in proximity to the aquaculture ponds and are used to maintain the supply of algae for the inoculation of the unpopulated seawater coming out of the OTEC greenhouse combination. These seeding ponds are run at a lower throughput rate and, instead of being harvested, are used to inoculate the aquaculture ponds with a large volume of densely growing algae. In a preferred embodiment, about 5% to 12%, for example, 6%, 7%, 8%, 9%, 10%, or 11%, of the water entering the aquaculture ponds on a daily basis is from these seeding ponds. In this embodiment, one seeding pond can continuously support 10 to 12 aquaculture ponds with algae. Use of seeding ponds, in effect, extends the residence time of the algae under optimal growth conditions and avoids having aquaculture ponds seeded at low density, thereby having to use less land for the aquaculture ponds. In an alternative embodiment, there are two or three tiers of seeding ponds that are staggered sequentially and have different depths. In this manner, the concentration of algae can be matched to the depth of the pond, to ensure that the transparency of the aquaculture water is optimized for the growth rate of the algae. In this way, less densely populated aquaculture ponds can be deeper. The advantage of this is the more economical use of land.

System Components
Water Heating Means

To heat the seawater, large greenhouses, preferably situated close to a coastline, will be used. In a preferred embodiment, to support a 100 MW OTEC plant, twenty greenhouses will each cover an area of between about 25,000 m² to about 100,000 m². As a person skilled in the art will appreciate, a smaller OTEC plant will require greenhouses with a smaller surface area, and a larger OTEC plant will require greenhouses with a larger surface area. In one embodiment, the OTEC plant is a 500 KW plant, and the greenhouses each have a surface area of between about 1,250 m² to about 5,000 m². In a further embodiment, a 500 MW OTEC plant is provided with greenhouses each having a surface area of about 125,000 m² to 500,000 m².

The surface under these greenhouses will preferably be lined with black impermeable plastic linings or geomembranes, similar to those that are used in landfills. This will assist in absorbing and transferring solar radiation to a free-flowing layer of seawater approximately 10 cm deep disposed across the length and width of each greenhouse. The depth of water in the greenhouses can range from less than 1 cm to 500 cm, for example, 5, 10, 20, 50, 100, 200, or 500 cm. In areas requiring significant solar heating of the seawater, in a preferred embodiment, the greenhouses are each about 250 m to about 1,000 m long and about 250 m to about 1,000 m wide and 3 m to about 5 m high.

In a preferred embodiment, the greenhouses are constructed from a plastic material. In a specific embodiment, the greenhouses are constructed from double layered improved polyethylene (PE) with 180 µm PE UV IR outer folia and 50 µm inner folia. In this embodiment, the greenhouse spans will cover multiple gutter-connected tunnels of approximately 10 meters in width and approximately 3 to 4 meters in height.[14] In a preferred embodiment, the inter-connected tunnels are supported by plastic beams standing in the pool of freely flowing seawater on the ground of the greenhouses.

At the entrance to the greenhouses, the water is nutrient-rich seawater from depth at a temperature of approximately 5° C. to 10° C., or surface seawater at a temperature of about 10° C. to 25° C. and as it flows towards the exit of the greenhouse, it reaches temperatures of over 30° C., for example, 40° C., 45° C., 50° C., 55° C. or hotter. The flow rate of the water can be altered to control the length of time the water spends in the greenhouse, and thereby control the temperature of the water leaving the greenhouse. Typically, the flow rate will be between 2 to 6 m/minute, preferably 4 m/minute.

Water vapor evaporating in the greenhouses as a consequence of the solar heating can be trapped inside the greenhouse. In one embodiment, the water vapor may be actively moved through the greenhouses to a large condenser, where it is cooled using seawater pumped from depth, which is at approximately 5° C.

In one aspect hereof, the freshwater condensate can be captured. It is estimated that in this manner, the water vapor created in a 12-hour period in one 50,000 m² greenhouse will, on average, produce at least 600 tons (m³) of freshwater per day. Since there are up to 40 greenhouses associated with a 100 MW plant in the preferred embodiment, 24,000 tons of freshwater can be extracted from the water vapor in the greenhouses alone, independent of the freshwater generated during OTEC power generation. Given the use of cold seawater already pumped for use in OTEC, it can also be used to cool the greenhouse water vapor, thereby creating freshwater condensate. It requires very little additional energy to harvest this additional freshwater resource from the water vapor created in the greenhouses. The greenhouse condensation step is performed in the secondary cycle already used for the condensation of water vapor generated through the OTEC cycle.

Another advantage of the greenhouse pre-treatment step is that it enables the control of the conditions under which the algae are grown. For example, solar heating the water in the greenhouse can be used to inactivate competing or deleterious organisms that might otherwise contaminate the coccolithophorid algae aquaculture or foul the equipment. Similarly, if there is unwanted biomass or particulates that might sediment in the aquaculture ponds, these contaminants can be effectively settled and removed from the seawater as it is travelling the length of the greenhouses.

In embodiments that involve the addition of nutrients to the seawater to optimize conditions for coccolithophorid algal growth in aquaculture, the nutrients may be added to the warmed water in the greenhouse to facilitate their dissolution.

By controlling the flow-rate of the water through the greenhouse, the temperature of the water can be adjusted before it enters the aquaculture ponds to ensure temperature stability in the aquaculture preserve, in spite of seasonal and environmental changes. Typically, the flow rate will be between 2 to 6 m/minute, preferably 4 m/minute. At a flow rate between 2 to 6 m/minute, the solar heating of the water will typically be approximately 0.10° C. per minute to 0.5° C. per minute and higher.

If, after mixing, the temperature of the blended cold and warm water is still too high to support coccolithophorid growth, it can be cooled. In one embodiment, the conditioned water is cooled by combining it with cold seawater pumped from depth. In a further embodiment, water temperature entering the aquaculture ponds can be adjusted to the optimum temperature for coccolithophorid growth by blending greenhouse-treated water and cold deep seawater. In another embodiment, the conditioned water is cooled by running it through a shaded section of the aquaculture pond before it is seeded with algae.

Energy Extraction

The seawater running through the greenhouse will have been heated and carry large amounts of solar energy. This warmed seawater coming out of the greenhouses can be passed through an energy extraction system to extract the captured solar energy and convert it to electricity.

The primary purpose of extracting heat energy from the greenhouse-heated seawater is to generate the energy necessary to move the large volumes of seawater that are required for the coccolithophorid algal aquaculture. Even though the pumps will only have to pump water over a small distance and height, the pumps will move large quantities of water. In the preferred embodiment of this invention, with a 100 MW OTEC plant, 400,000 tons/hour cold water and 400,000 tons/hour of surface seawater are pumped through the OTEC plant over a 24-hour period, equivalent to 19.2 million tons of water/day. The secondary purpose of energy extraction is, therefore, to create excess energy that can be sold and/or drive complementary services and processes, for example, the harvesting of algae.

Due to the heat capacity of water, this energy extraction system is stable and based on the bulk heat trapped in seawater and, thus, will be unaffected by temporary fluctuations such as changes in weather conditions like cloud cover.

In some embodiments, OTEC facilities can be used to generate electricity at night in the conventional mode, i.e., without greenhouse solar-heated water, to generate additional electricity on a 24-hour cycle. For those OTEC plants located in areas where the surface water is sufficiently hot to drive the OTEC energy production process without solar heating, energy flow is continuous, even after solar heating has stopped during the night. In other embodiments, the heated greenhouse water can be stored in large surge tanks to provide hot seawater after dark, thereby extending the operational hours of the heated-seawater OTEC system after dark.

OTEC

Ocean Thermal Energy Conversion (OTEC) has been in development and piloted extensively (see, Cuba 1930, Cote d'Ivoire 1956, Keahole Point 1979, Nauru 1982-84, Hawaii 1993). OTEC is, therefore, a well-established technology that is used to generate electricity based on the temperature difference between warm surface seawater and cooler deep seawater. Conventional OTEC is designed to exploit the temperature gradient of cool (4° C. to 7° C.) seawater and warm (20° C. to 28° C.) surface seawater to generate electricity.

OTEC works by pumping large volumes of warm, generally surface seawater over a series of evaporators to create a driving gas that spins turbines. The driving gas then is condensed in a heat exchanger with cold deep seawater.

There are four major variants of OTEC, any of which are suitable for use in the invention. The four major variants of OTEC are:

Closed cycle—where the warm water evaporates a driving gas, such as ammonia, that is then condensed with cold seawater in a closed system. The closed cycle uses a Rankine process with a low pressure turbine.

Open cycle—the Claude process where the warm water is used to create low pressure steam through flash evaporation in a low pressure chamber. The low pressure steam is then used to drive turbines and can then be condensed and harvested as freshwater.

Kalina process—which can be run in a closed cycle mode using a mixed ammonia/water as the low boiling point liquid used to drive the turbines more efficiently, thereby increasing the energy yield of the OTEC process.

Hybrid process—where the warm and cold seawater used for power is driven through a secondary loop used for the evaporation and condensation of water vapor to create large amounts of freshwater.

The particular OTEC system chosen will depend on the local geography and can be configured as required to maximize the production of energy or freshwater in addition to creating the algal biomass.

OTEC can be deployed in modules according to the volumes of water treated. The solar heating of the seawater in the invention leads to a higher relative temperature differential between the greenhouse-heated water and the coastal deep seawater than is found in conventional OTEC systems. This increased temperature differential increases the efficiency of the OTEC system. At a temperature differential of around 40° C. between the deep ocean water and the solar heated water, a much higher energy extraction efficiency is expected.

In conventional OTEC systems, given the low temperature differential of the surface seawater to the cold deep water of approximately 15° C., the energy extraction yield is theoretically limited to 6% to 7%.[15] However, practically, the yield is closer to 2.16% for the Rankine process or 4.5% for the Kalina process.[16]

In the modified OTEC systems used in the invention, the theoretical thermodynamically maximum energy yield increases from a maximum 7% to about 8.4% and, consequently, the operational energy yield can increase approximately from less than 4.5% to greater than 5%.

The increase in efficiency is due, in part, to the increased energy content of the solar-heated seawater used in the invention, which results in a 240% increase in kWhr yield during daylight operating hours and more than a 20% increase in extraction yield. A further increase in efficiency is due to the ease with which the heated seawater will create low pressure steam through flash evaporation in the low pressure chamber of the hybrid open-cycle OTEC system.

In a further aspect, also provided is a method for increasing the efficiency of ocean thermal energy conversion (OTEC) wherein the source water for the OTEC process is i) cold seawater and ii) seawater that has been warmed in land-based greenhouses using solar energy. In a further embodiment of this aspect hereof, there is provided a system for generating energy using OTEC comprising a means for heating seawater using solar energy and an ocean thermal energy conversion (OTEC) system adapted to use the heated surface water from step a) and cold seawater.

OTEC offers additional benefits when used in accordance with the method hereof. For example, as described above, it can be used to generate freshwater. It is estimated herein that up to 120,000 tons of freshwater per day can be generated by a single 100 MW OTEC plant. This side-product may be especially beneficial in the arid locations where the invention will be exploited. Furthermore, the increased evaporation efficiency described above also significantly increases the yield of freshwater from the desalination component of the OTEC systems hereof.

Water Conditioning

By running the seawater through the greenhouse for solar heating, the system hereof pre-treats the seawater before it is used for aquaculture. In one embodiment, the water running through the greenhouse is a blend of nutrient-rich deep water and seawater (previously used for condensation of freshwater in adjacent greenhouses). Depending on the season, these waters can be nutrient-depleted or harbor an abundance of confounding but naturally occurring organisms. Running the water through the greenhouses permits the adjustment of water quality, for example, by adding nutrients or removing unwanted or competing biomass. This water conditioning stage also permits a small time buffer for seawater analysis and process adjustments to ensure that water entering the ponds will support maximum algal yield.

Conditioning the seawater in the greenhouses before it is used for aquaculture has several advantages. Naturally occurring organisms are effectively inactivated in the heat and by the intense solar radiation of the greenhouses and thereby are prevented from out-competing the desired algae, fouling the aquaculture ponds or stimulating the growth of coccolithovirus. Naturally occurring and inactivated biomass can be harvested before the water enters the aquaculture preserve. Measures to prevent fouling of equipment and the aquaculture ponds can be taken. In one embodiment, water purification using peroxide can be carried out before the heated seawater runs through the energy extraction or aquaculture process.

Nutrients can be added to the water as it passes thorough the conditioning phase. In one embodiment, calcium minerals can be added, in particular, in the form of apatite, to stimulate and maximize high yield coccolithophorid growth and prevent acidification of the seawater. In a preferred embodiment, calcium-rich minerals, nitrate and inorganic phosphate, for example, in hydroxylapatite, fluorapatite, and chlorapatite ($Ca_5(PO_4)_3(OH)$, $Ca_5(PO_4)_3F$ and $Ca_5(PO_4)_3Cl$), calcium nitrate, fertilizer known as Norwegian saltpeter ($Ca(NO_3)_2$),[17] can be added to enhance growth. In some embodiments, alkali minerals can be added to directly counteract ocean acidification including $CaCO_3$ to re-mineralize the water, CaO (quick lime) to replace Ca directly and alkalize the seawater and ensure that the seawater reaches the same degree of Ca super-saturation it would have had before ocean acidification.

The minerals can be added at multiple points when the seawater is pumped or processed including in the OTEC plant, in the greenhouses while the water is being heated, while the water is entering and passing through the aquaculture ponds, provided for the growth of seed algae in seeding ponds that do not form part of the aquaculture ponds, added together with the inoculants of algae used to seed the seawater and/or applied after the algae have been harvested and the seawater is returned to the ocean.

Minerals can be dissolved or added as a slurry to return the seawater to a natural state of super-saturation with respect to calcium ions.[18] The algal growth itself will accelerate the dissolution of minerals and accelerate the absorption of minerals. This returns the seawater to natural levels of Ca super-saturation (between 200% to 420% Ca super-saturation) and pH. It also actively mitigates ocean acidification, even after the water has been discharged from the aquaculture ponds. In many proposed coastal regions, the seawater brought into the OTEC plants will be of lower Ca super-saturation (due to ocean acidification) and this method will actively improve local seawater quality.

Because of the nutrient-rich deep waters used to cool the heat exchangers in the OTEC facilities, relatively few nutrients will have to be added to support high *E. huxleyi* growth rates. However, micro-nutrients and minerals may also be added to replace the Ca sequestered in the *E. huxleyi* and prevent ocean acidification and boost algal growth. Similarly, $HCO_3^-$ bicarbonate ions may be added to ensure that *E. huxleyi* is not growth limited due to low carbon availability.

Aquaculture Ponds

Aquaculture ponds can be built from low cost materials as they only require the shaping of land without concrete retention walls or firm structures. These coastal aquaculture ponds can be built similarly to prawn or shrimp aquaculture ponds. Highway building equipment used to sculpt the landscape before construction is sufficient. Aquaculture ponds are preferably long, wide, shallow troughs with an earthen barrier that retains the seawater. The bottom of the aquaculture ponds is preferably lined with impermeable material. If necessary, a clay lining can be spread underneath the water barrier to prevent saltwater intrusion onto land. In a preferred embodiment, each aquaculture pond can be lined with 10 cm to 20 cm thick clay lining or geomembranes used in landfills and then covered with layers of impermeable white plastic lining or geomembrane. In addition to the clay lining, in some embodiments the aquaculture ponds also comprise a 2 mm to 5 mm thick synthetic liner such as HDPE will be used to prevent intrusion of seawater onto land. The advantage of synthetic liners such as HDPE is that they are easily repaired, edges can be fused (to seal leaks) and they are very robust. If the land needs to be repurposed, the lining can be readily removed and the earthen barriers leveled.

The aquaculture ponds are scaled to hold about 1 to 20 days, preferably 1 to 7 days, even more preferably 6 days' worth of aquaculture seawater that is being emitted from the OTEC-greenhouse combination plus the water introduced from the seeding ponds. In a preferred embodiment, the aquaculture ponds are configured to accommodate the water from a greenhouse that heats 240,000 tons of seawater per day per greenhouse and an equivalent of 240,000 tons of OTEC pumped cold seawater, plus the inoculants from the seeding ponds of approximately 40,000 tons per day. This equals approximately 520,000 tons of seawater entering in the array of aquaculture ponds each day. For 6 days residence time in the aquaculture ponds, the total volume of an aquaculture pond in a preferred embodiment is approximately 3.1 million tons ($m^3$) of seawater. The typical depth of a single aquaculture pond is 3 meters, which ensures maximum atmospheric gas exchange. The surface area of a typical aquaculture pond will be approximately 1 $km^2$. In a preferred embodiment, there will be approximately 40 aquaculture ponds and four seeding ponds for each 100 MW OTEC plant. As a person skilled in the art will appreciate, the total number and size of the aquaculture ponds will vary with the size of the OTEC plant. For example, in one embodiment, the OTEC plant is a 500 KW plant, which is provided with up to 2 km$^2$ of aquaculture ponds and a seeding pond of a correspondingly adjusted size. In a further embodiment, a 500 MW plant is provided with approximately 200 km$^2$ of aquaculture ponds, and 20 seeding ponds.

Configuration of System Components

The configuration of the OTEC plants, greenhouses, seeding ponds, aquaculture ponds and harvesting area is flexible and can be configured to adapt to local geographic and meteorological conditions. Since water may flow over large distances between greenhouses, pipes can be laid to move the seawater where it is needed. These pipes may be insulated to preserve the appropriate water temperature. A typical arrangement of the components is shown in FIG. 1.

In a preferred embodiment, the OTEC plant is a 100 MW plant. Typically, this size of OTEC plant can support 40 greenhouses, 4 seeding ponds for the initial growth of the inoculant algae, and 40 aquaculture ponds with a total volume of 3.1 million m$^3$, and associated harvesting areas. Depending on the local climate and the ambient temperature of the surface water, each greenhouse covers on average 50,000 m$^2$.

Given that the greenhouses need to supply the OTEC plants with heated water, the greenhouses can be located in close proximity to the OTEC plant, reducing the need to move the heated water over large distances. Since the temperature of the discharge from the OTEC plant is less critical before it enters the aquaculture pond, these can be transported over larger distances without fear of heat loss.

For these reason, the aquaculture ponds can be aligned close to the coast, hugging the coastline either in single file or arranged in parallel rows, while the greenhouses are clustered around a central OTEC plant. This T-shaped arrangement will reduce pipelines needed and allows for the sharing of algal harvesting equipment, for example, reducing overall capital costs.

Carbon Offsetting

Current forecasts for carbon offsets per ton of $CO_2$ sequestered range from $7 to $170 between now and 2050.[19] These estimates are based on extrapolation of the experience with the European Union Emission Trading Scheme (EU ETS) that established a functioning carbon market with a large-scale emissions cap and trade system. Between April 2005 and April 2006, the spot price averaged at approximately £22 per ton carbon offset. These prices are premised on the assumption that $CO_2$ emitting industries and sources can trade their emissions for carbon offsets that reduce equivalent emissions elsewhere. Challenges to the system have included the fact that the reduction in emissions are difficult to verify and that offsetting reductions in emission would have happened anyway (thereby reducing the value of the offsets). New proposals for Cap and Trade systems are under discussion before the Copenhagen meeting in Copenhagen 2009.

The methods of carbon sequestration hereof are immune to both these challenges. Firstly, the sequestered carbon is physically available for analysis and can be documented without any ambiguity. Secondly, none of the biomass would have been created otherwise. The purpose of the scheme is entirely to create additional biomass from abundant resources without offsetting other food, biomass-generating or carbon fixing activities (and without creating new sources of $CO_2$ emission, for example, through the burning of fossil fuel to generate the power needed to operate the system). The carbon intensity of traditional OTEC is already lower than that of hydroelectric power.

Based on these advantages, the methods hereof qualify for the highest quality carbon offset ratings and can secure the maximum rewards available through direct payments. Alternatively, revenue can be generated from the biomass generated alongside the $CaCO_3$, making the system independent of the carbon offset market.

All references cited herein are incorporated in their entirety.

The disclosure will now be described in detail, with specific reference to a system that utilizes the coccolithophorid algae *Emiliana huxleyi*. It will be appreciated that modification of detail can be made without departing from the scope hereof.

EXAMPLES

The preferred embodiment is based on a power plant that generates 100 MW net power per year. The power plant is a hybrid OTEC plant combining both energy production using the Uehara or Kalina cycle as well as freshwater generation through a hybrid low pressure steam generation cycle. Actual gross power production exceeds the energy production by approximately 35% to 45%. Most of the internal consumption of power is the result of pumping 400,000 tons of cold deep ocean water and 400,000 tons of warm surface water for 24 hours per day 340 days per year. Operating the large compressors to run the Uehara or Kalina energy production cycle in the hybrid OTEC plant and the high volume vacuum pumps to create low pressure steam for the secondary freshwater condensation cycle also consumes power. Given the need to move water through greenhouses and pumping it over kilometers to the aquaculture ponds, additional power is needed to power pumps.

Warm surface seawater will be drawn in through a series of 5 m glass fiber-reinforced plastic (FRP) pipes from a depth of 5 to 20 meters. The warm seawater will be distributed through a network of pipes to be distributed across 20 greenhouses. For the 12 daylight hours, the water will flow over the ground of the greenhouses to a depth of 10 to 15 centimeters, at a flow rate of 6 meters per minute, and across a width of 1,000 meters for greenhouses that are 500 meters long. In this manner, each greenhouse will warm more than 475,000 tons of seawater from ambient temperature to consistently 40° C. and higher.

The surface under these greenhouses will preferably be lined with black impermeable plastic lining, similar to those that are used in landfills. Underneath the plastic, a clay lining or geomembrane to prevent leaks will also ensure a uniform surface for the seawater to flow over. The greenhouses are constructed from a plastic material spars and beams to form multiple gutter-connected tunnels of approximately 10 meters in width and approximately 3 to 4 meters in height. As many as 100 of these 500-meter long tunnels will be connected side by side to cover as much as 50 ha of land. Connecting the greenhouse tunnels saves material and allows for the free movement of air. The greenhouses will be covered with double-layered improved polyethylene (PE) with 180 µm PE UV IR outer folia and 50 µm inner folia. The interconnected tunnels are supported by plastic beams standing in the pool of freely flowing seawater on the ground of the greenhouses.

Exiting the greenhouses, the hot water will be collected and pumped through a manifold of insulated 1 meter internal diameter pipes to fill a large surge tank covered with a floating insulating material to retain the temperature of the solar-heated water. This water is used to feed the power-generating cycle of the OTEC power plant. The surge tank buffers the flow of heated water as the greenhouses fill with water, after dawn when solar-heated water is available, and drains after sunset. By doing this, they effectively extend the power generation cycle of the OTEC plant beyond daylight hours, providing process continuity and temperature stability.

For the condensation of both the turbine driving gas as well as the condensation of freshwater, depending on the local ocean thermocline, the cold deep water is pumped through an array of 3 m (inside diameter) FRP reaching to a depth of 600 to 1,000 meters. On the surface, these pipes are insulated to retain the low temperature of the deep water. In the hybrid OTEC plant, the cold water is used sequentially in a two-step process, first to cool the power generation cycle and second, to cool the freshwater condensers in the freshwater generation cycle.

The cold deep water discharge from the OTEC plant is nutrient rich and collected in a cold water discharge basin to manage surges, for distribution to the seeding ponds and to fill the aquaculture ponds. The surge tank again provides storage capacity to steady the flow through the aquaculture ponds.

Similarly, the OTEC discharge from the power generation cycle that has significantly cooled in the process of generating power and creating freshwater is collected in a warm water discharge surge basin. The water in the warm water OTEC discharge basin is used to control the rate of filling the aquaculture ponds and control the water temperature in the aquaculture ponds as needed. This basin is also the preferred site for the addition of minerals and nutrients to maximize the growth of algae in the aquaculture ponds. Nutrients are added as the water is discharged from the OTEC power generation cycle to ensure that the residual heat, together with the residence time in the surge tank, ensures the dissolution of approximately 10 tons of the fertilizers hydroxylapatite $Ca_5(PO_4)_3(OH)$ and 5 tons of the fertilizer Norwegian Saltpeter $Ca(NO_3)_2$ per day. Other fertilizers may be added according to need.

The nutrient-rich cold water and the fertilized warm water are then distributed to the seeding and aquaculture ponds. The seeding ponds are identical to the aquaculture ponds in their structure. The only difference is that the concentration of algae in the ponds is lower at the beginning, the flow rate through the aquaculture pond is slower, and the discharge is used to seed up to 12 aquaculture ponds with algae instead of harvesting the algae. The purpose of the seeding ponds is to provide consistent inoculants for the array of aquaculture ponds and to extend the effective residence time of the algae in culture. The residence time of E. huxleyi in the seeding ponds is 6.3 days and this results in an increase from 23 million cells per liter to approximately 230 million cells per liter of seawater.

The water from the seeding ponds is added directly into the manifold at the point where the cold water discharge is added to the distribution manifold, thereby eliminating the need for a seeding pond water distribution system. The manifolds provide 40,000 tons of seeding pond water, 240,000 tons of cold seawater and 237,000 tons of warm water (or a total of 477,000 tons of seawater) for each aquaculture pond per day.

From the cold and warm water discharge basins, a pipeline manifold of 1-meter internal diameter pipes feeds the seeding and aquaculture ponds with mixed water to support an average flow rate of 1.1 meters per minute over a 24-hour period. The aquaculture ponds are designed to accommodate the daily flow of 477,000 tons of mixed cold, warm and seeding pond water per day. Forty aquaculture ponds, each covering a 1-kilometer square, are comprised of 100-meter wide and 3-meter deep tracks that fold back onto themselves ten times, resulting in a total aquaculture pond length of 10,000 meters. The aquaculture ponds are lined with both a 10-cm clay geomembrane and white, double HDPE lining to prevent leaks and seawater intrusion on land.

At the flow rate of 1.1 meters per minute, the average residence time of the water in each aquaculture pond is 6.3 days. This residence time supports up to ten doublings of E. huxleyi in their exponential growth phase in the aquaculture pond. With an inoculant cell density of 300,000 cells per liter introduced at the beginning of the aquaculture pond, the final cell density at harvest is approximately 3,000,000 cells per liter. This equates to approximately 1.5 gr of coccolithophorid cells being created in exponential cell growth per liter of seawater.

At a volumetric flow of 475,000 tons of water through each aquaculture pond through 40 ponds for an operational period of 340 days per year per pond, this generates approximately 10 million tons of pure $CaCO_3$ in the form of coccoliths per year. In addition, 150 to 180 million tons of algal biomass is grown to be harvested.

As the water flows through the final 100-meter section of the aquaculture pond, it passes over an array of fine-bubble curtains, generated by a series of pipes spaced 5 meters apart at the bottom of the aquaculture ponds. These bubbles become entrained in the algal aggregates forming naturally as the bloom of algae in the aquaculture pond matures. As the cells age, they begin to release TEP, which assists in the cross-linking of cells into small aggregates. As bubbles become entrained in these aggregates, they float to the surface. This harvesting process can be further accelerated through the use of clarifiers used in wastewater treatment or particulate mineral processing to remove residual algae. At the surface, the aggregates accumulate and form a thick carpet of algal slurry, which is skimmed by automated surface skimmers. It is estimated that given the configuration of this example, each aquaculture pond will generate approximately 60,000 tons of this slurry per day per pond. This surface-slurry is then further thickened in deep cone thickeners or clarifiers five- to ten-fold through the addition of one nanomole concentration high molecular weight cationic polymer or flocculants. The resulting sludge of approximately 9,000 tons of algal sludge per pond per day is transported on mesh-covered long conveyor belts where the sludge drains more of the remaining seawater. The aquaculture water that drained out of the algal slurry is then returned to the aquaculture ponds.

This algal paste on the conveyor belts is distributed over drying fields that are lined with geomembranes to dry in the ambient air. When the sludge has reached a moisture content of approximately 40%, it can be stockpiled for further processing.

The harvested algae can be further processed by fragmentation into multiple components. Processing of the harvested algae at a basic pH enables the separation of the coccoliths from the remaining organic biomass.

Once extracted, the organic biomass can be used for the production of biological oils, fatty acids, bio-fuels,[20] and other materials that can be used for the generation of, for example, animal feedstock. Further processing of the biomass can include high temperature pyrolysis at 500° C. in a fast fluid bed reactor to create combustible gas, bio-oil and bio-char. In a further embodiment, the bio-char remnants from such further processing could be used to create soil conditioner or fertilizer for local agriculture. Methods for processing algae are well known in the art.

The seawater is gravity drained from each aquaculture pond back to the ocean at a depth of approximately 10 to 60 meters or greater depth according to the neutral buoyancy of the water. If the pH balance at the end of the aquaculture pond requires adjusting, additional calcium-based minerals can be added before discharge to the ocean through one- to five-meter internal diameter pipes.

REFERENCES

1. [IPCC, 2005] *IPCC special report on Carbon Dioxide Capture and Storage*. Prepared by working group III of the Intergovernmental Panel on Climate Change. B. Metz, O. Davidson, H. C. de Coninck, M. Loos, and L. A. Meyer (eds.). Cambridge University Press, Cambridge, United Kingdom and New York, N.Y., USA, 442 pp.
2. Buitenhuis E., J. Bleijswijk, D. Bakker, and M. Veldhuis (1996). "Trends in inorganic and organic carbon in a bloom of *Emiliania huxleyi* in the North Sea," *Marine Ecology Progress Series* 143(1-3):271-282.
3. Claude G. (1930). "Power from the Tropical Seas" in *Mechanical Engineering*, Vol. 52, Nos. 12, 19, pp. 1039-1044.
4. U.S. Pat. No. 1,952,520.
5. U.S. Pat. No. 4,726,191.
6. U.S. Pat. No. 5,967,085.
7. Fabry V. (2002). "Calcium Carbonate Production by Coccolithophorid Algae in Long Term, Carbon Dioxide Sequestration," DE-FC26-01NT41132 *Quarterly Progress Report #6*, December 2002.
8. Passow U. and A. L. Alldredge (1994). Distribution, size and bacterial colonization of transparent exopolymer particles (TEP) in the ocean. *Mar. Ecol. Prog. Ser.* 113:185-198.
9. Wang Lawrence K., Yung-Tse Hung, Howard H. Lo and Constantine Yapijakis (2004). "Dissolved Air Floatation" in *Handbook of Industrial and Hazardous Wastes Treatment* (2nd ed.), CRC Press, ISBN 0-8247-4114-5.
10. Balch W., K. Kilpatrick and P. Holligan (1993). "Coccolith formation and detachment by *Emiliania huxleyi* (Prymnesiophyceae)," *J. Phycol.* 29:566-575.
11. Buitenhuis E., J. Bleijswijk, D. Bakker, and M. Veldhuis (1996). "Trends in inorganic and organic carbon in a bloom of *Emiliania huxleyi* in the North Sea," *Marine Ecology Progress Series* 143:(1-3) 271-282.
12. Keller M. D., R. C. Selvin, W. Claus, and R. R. I. Guillard. (1987). *Journal of Phycology* 23:633-638.
13. Guillard R. R. L. (1975). "Culture of phytoplankton for feeding marine invertebrates," pp. 26-60, in W. L. Smith and M. H. Chanley (eds.), *Culture of Marine Invertebrate Animals*, Plenum Press, New York, USA.
14. Dević M., Aleksandra Dimitrijević (2004). "Greenhouse energy consumption and energy efficiency," *Energy efficiency and agricultural engineering* 2005, International conference, Russe, Bulgaria.
15. U.S. Pat. No. 4,346,561.
16. Laue W., M. Thiemann, E. Scheibler, and K. W. Wiegand (2002). "Nitrates and Nitrites" in *Ullmann's Encyclopedia of Industrial Chemistry*, Wiley-VCH, Weinheim.doi: 10.1002/14356007.a17_265.
17. Laue W., M. Thiemann, E. Scheibler, and K. W. Wiegand (2002). "Nitrates and Nitrites" in *Ullmann's Encyclopedia of Industrial Chemistry*, Wiley-VCH, Weinheim.doi: 10.1002/14356007.a 17_265.
18. Orr J. C., et al. (2005). "Anthropogenic ocean acidification over the twenty-first century and its impact on calcifying organisms," *Nature* 437:681-686.
19. Paltsev S., J. M. Reilly, H. D. Jacoby, A. Gurgel, G. Metcalf, P. Sokolov, and J. Holak (2007). "Assessment of U.S. Cap-and-Trade Proposals," *MIT Joint Program on the Science and Policy of Global Change*, Report 146 (April 2007).
20. Wu Q., B. Zhang, and N. G. Grant (1996). "High yield of hydrocarbon gases resulting from pyrolysis of yellow heterotrophic and bacterially degraded *Chlorella protothecoides*," *Appl. Phycol.* 8:181-184.

What is claimed is:

1. A method of sequestration of carbon dioxide from the atmosphere into solid form, the method comprising:
   culturing coccolithophorid algae in seawater using land-based aquaculture under conditions wherein atmospheric carbon dioxide is converted by the algae into calcium carbonate and/or bio-char;
   a. wherein the seawater in which the algae are cultured is the discharge of ocean thermal energy conversion (OTEC) condensers and greenhouses; and
   b. wherein the source water for the OTEC process is provided by i) cold seawater and ii) seawater that has been warmed in land-based greenhouses using solar energy to a temperature sufficient to inactivate substantially all microorganisms.

2. The method according to claim 1, wherein the discharge of the OTEC process is combined with seawater to provide water at the optimum temperature for coccolithophorid algal aquaculture.

3. The method according to claim 1, further comprising: adding exogenous nutrients and/or minerals to the aquaculture water.

4. The method according to claim 2, further comprising: adding exogenous nutrients and/or minerals to the aquaculture water.

5. The method according to claim 1, further comprising: harvesting the coccolithophorid algae.

6. The method according to claim 2, further comprising: harvesting the coccolithophorid algae.

7. The method according to claim 3, further comprising: harvesting the coccolithophorid algae.

8. The method according to claim 4, further comprising: harvesting the coccolithophorid algae.

9. The method according to claim 5, wherein the harvested algae are dried and/or wherein the biomass and the coccoliths of the algae are separated.

10. The method according to claim 6, wherein the harvested algae are dried and/or wherein the biomass and the coccoliths of the algae are separated.

11. The method according to claim 7, wherein the harvested algae are dried and/or wherein the biomass and the coccoliths of the algae are separated.

12. The method according to claim 8, wherein the harvested algae are dried and/or wherein the biomass and the coccoliths of the algae are separated.

13. The method according to claim 5, further comprising returning the water to the sea after aquaculture.

14. The method according to claim 6, further comprising returning the water to the sea after aquaculture.

15. A system for sequestering carbon using coccolithophorid algae, the system comprising:
   a. greenhouses for heating seawater using solar energy,
   b. an ocean thermal energy conversion (OTEC) system adapted to use the heated surface water from step a) and cold seawater; and
   c. a flow-through, land-based coccolithophorid algae aquaculture preserve provided with water from the OTEC condensers of part (b) and the greenhouses.

16. The system according to claim 15, wherein the aquaculture preserve comprises a flow-through aquaculture pond.

17. The system of claim 15, wherein the aquaculture preserve has a surface area of about 1 to about 40 km².

18. The system of claim 16, wherein the aquaculture preserve has a surface area of about 1 to about 40 km².

19. The method according to claim 1, wherein the coccolithophorid algae is *Emiliana huxleyi, Gephyrocapsa oceanica, Calcidiscus leptoporus, Coccolithus braarudii, Braarudosphaera bigelowi*, and/or *Syracosphaera pulchra*.

20. The method according to claim 19, wherein the coccolithophorid algae is *Emiliana huxleyi*.

21. The method according to claim 1, further comprising:
    adding alkali minerals to the seawater to counteract ocean acidification.

22. The method according to claim 2, further comprising:
    adding alkali minerals to the seawater to counteract ocean acidification.

23. The method according to claim 9, wherein the algae releases Transparent Exopolymer Particles (TEP) prior to harvesting.

\* \* \* \* \*

UNITED STATES PATENT AND TRADEMARK OFFICE
CERTIFICATE OF CORRECTION

PATENT NO. : 8,440,439 B2  
APPLICATION NO. : 13/600425  
DATED : May 14, 2013  
INVENTOR(S) : Raffael Jovine Page 1 of 1

It is certified that error appears in the above-identified patent and that said Letters Patent is hereby corrected as shown below:

In the drawings:

In FIG. 1, Add text at bottom of figure --FIG. 1--

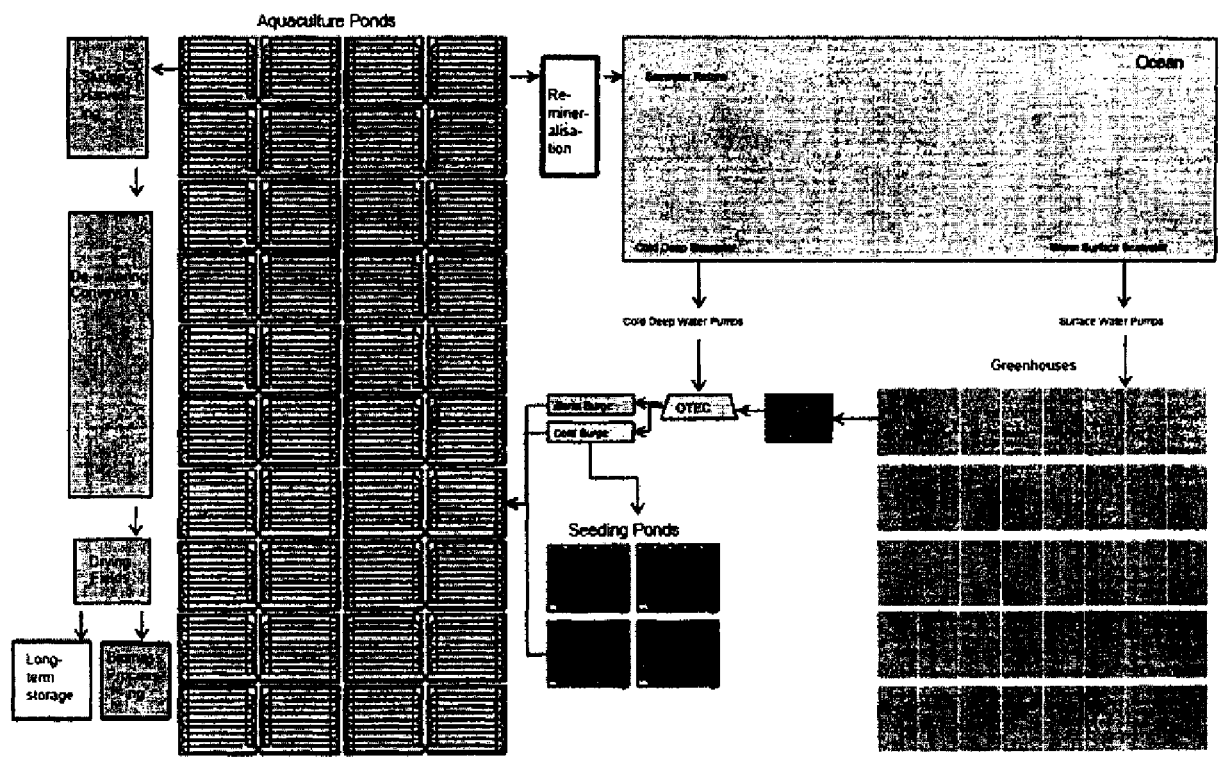

FIG. 1

Signed and Sealed this
Third Day of March, 2015

Michelle K. Lee
*Deputy Director of the United States Patent and Trademark Office*